UNITED STATES PATENT OFFICE.

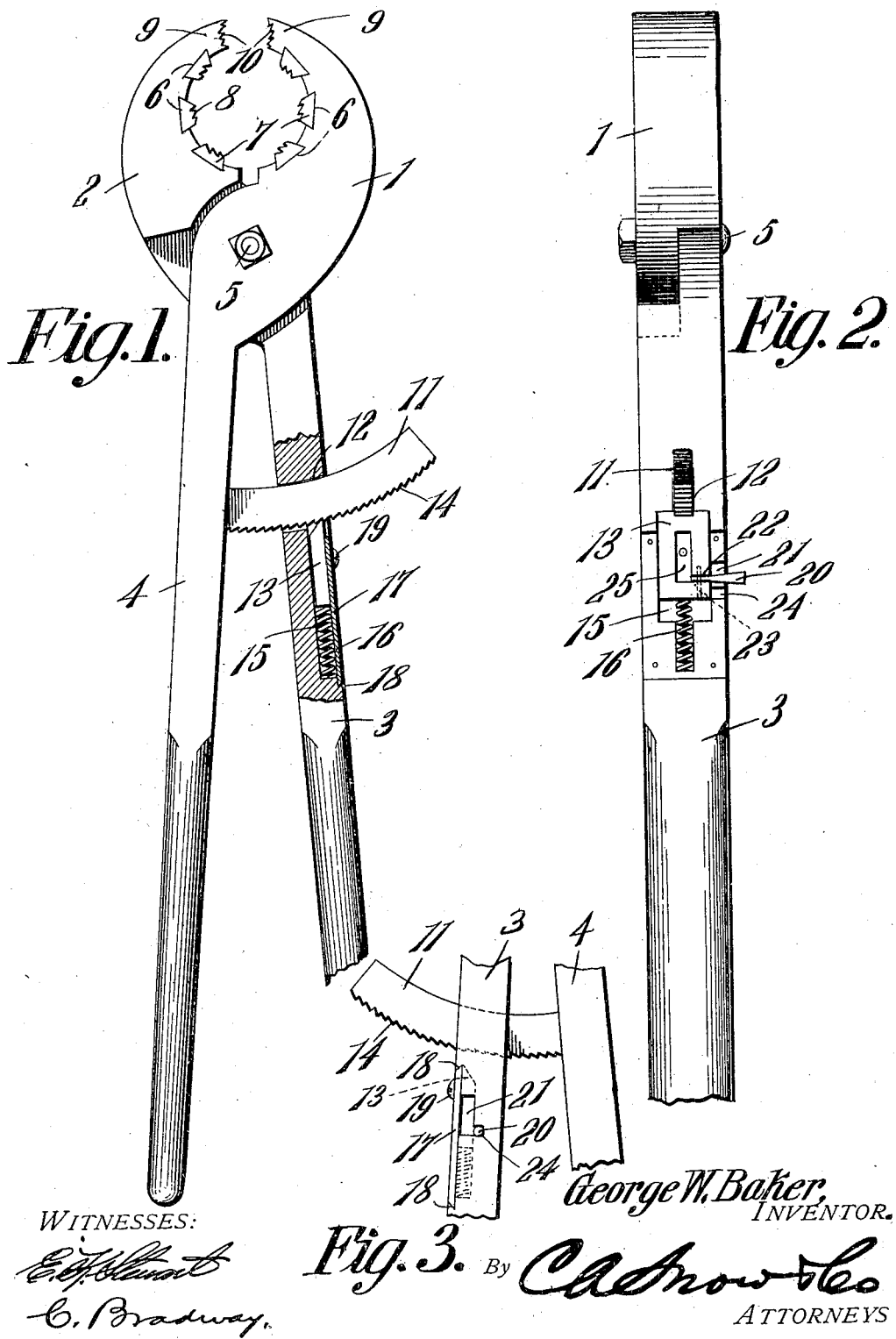

GEORGE WASHINGTON BAKER, OF OXFORD, FLORIDA.

PIPE-TONGS.

No. 838,514.  Specification of Letters Patent.  Patented Dec. 18, 1906.

Application filed August 22, 1906. Serial No. 331,635.

*To all whom it may concern:*

Be it known that I, GEORGE WASHINGTON BAKER, a citizen of the United States, residing at Oxford, in the county of Sumter and State of Florida, have invented a new and useful Pipe-Tongs, of which the following is a specification.

This invention relates to tongs designed for use in connection with pipes and round bars of that type having teeth or gripping members set in the jaws to form the main gripping portions of the latter and having additional auxiliary teeth provided at the lips of the jaws for gripping pipe of relatively small diameter.

The invention has for one of its objects to improve and simplify the construction and operation of a device of this character, so as to produce a maximum leverage and gripping effect.

A further object of the invention is the provision, in connection with pipe-tongs of the character referred to, of means whereby the maximum gripping effect of the jaws can be automatically maintained, so that the tongs will not loose their grip when the power is removed from the handle unless when particularly desired by the operator.

With these objects in view and others, as will appear as the nature of the invention is better understood, the invention comprises the various novel features of construction and arrangement of parts to be more fully described hereinafter, and set forth with particularity in the claims appended hereto.

In the accompanying drawings, which illustrate one of the embodiments of the invention, Figure 1 is a plan view of the tongs, showing a portion broken away. Fig. 2 is a side view showing the plate covering the pawl of the locking device removed. Fig. 3 is a fragmentary detail view of the locking device, showing the pawl in inoperative position.

Corresponding parts in the several figures are indicated throughout by similar characters of reference.

Referring to the drawings, 1 and 2 designate the jaws of the tongs, and 3 and 4 the shanks or handles thereof. The members of the tongs are of any desired size and shape and are pivotally connected by the bolt 5. The jaws, which are preferably of the claw type, are provided with a plurality of parallel grooves 6 on their concaved surfaces, said grooves being dovetail in cross-section, so as to receive gripping members or teeth 7. These members 7 are shaped to correspond to the grooves and are frictionally or otherwise held in fixed position therein. The outer faces of the members 7 are provided with serrations 8, that are beveled at a greater angle in one direction than in the other, so that they are adapted to bite into the pipe when the tongs are turned only in one direction. The members 7 are made of a suitable grade of steel, so as to withstand wear, and being set in the jaws of the tongs they can be readily replaced by other members having coarser or finer serrations. These teeth on the inner portions of the jaws constitute the main teeth of the tongs and are adapted to be used for operating on pipes of comparatively large diameter. To use the tongs for small-sized pipes, the lips 9 of the jaws are slightly concaved, and the concaved surfaces are formed with serrations 10, that form the auxiliary teeth of the jaws. It will thus be seen that the tongs have a large range of operation.

In connection with pipe-tongs it is desirable to provide a ready and effective means to hold the tongs tightly locked or clamped on the pipe, so that the bite will not have to be renewed every time the power is removed from the handles. For this purpose a locking device is provided which comprises a segmental arm 11 on one of the handles and extending through an opening 12 in the other handle, and a spring-pressed pawl 13, which engages serrations 14 on the arm 11. The handle 3, having the opening 12, is recessed on its outer surface to form a chamber 15 in which the pawl 13 is arranged. Confined within the chamber and arranged between one wall thereof and the pawl is a helical compression-spring 16, which constantly urges the pawl toward the serrated arm 11. The chamber 13 is closed by a cover 17, whose top and bottom ends are beveled to engage under overhanging shoulders 18 on the handle 3. The cover is thus removable by a lateral movement after the retaining-screw 19, that passes through an aperture in the cover and screws into the handle, has been removed. The serrations 14 are so formed that the pawl 13 will ride freely over the same as the handles 3 and 4 are moved toward each other.

It will be noted that a particular relati exists between the serrations of the gripp member 7 and the serrations 14 of the l ing device. Thus as the handle 3 is drawn toward the handle 4 the serrations 8 of the gripping members will bite deeper and deeper into the pipe, and at the same time the pawl 13 will ride under the serrations 14 and take up the full movement of the handles, so that the grip of the jaws will be positively prevented from lessening after the maximum bite has been produced. It will thus be seen that the greater the strain produced on the handles to move the pipe, the greater will be the grip of the jaws, and the locking device will automatically maintain the maximum grip. One advantage of this arrangement is that after the tongs have been once applied to a pipe they will be positively held thereon, so that a new bite will not have to be taken with each new purchase on the tongs. This will save time and, furthermore, reduce the marring of the pipe to a minimum.

In order to release the dog when it is desired to take the tongs off the pipe, the pawl is provided with a finger 20, that projects through a slot 21, extending laterally from the chamber 15. Thus by depressing the finger 20 the pawl can be released from the serrations 14 and the tongs opened. It may sometimes be desirable to manipulate the tongs without using the locking device, and for this purpose the pawl is adapted to be held in an inoperative position. To this end the finger 20 is pivotally mounted on the pawl, the inner end of the finger being arranged in a slot 22 of the pawl and held therein on a pivot-pin 23. One end of the recess 21 is offset at 24 so as to form a notch, in which the finger is caused to engage when the pawl is to be held out of engagement with the serrated arm 11. When the pawl is held in its inoperative position in this manner, the tongs can be used in the usual manner. As shown in Fig. 2, the pawl has a central opening 25 through which the retaining-screw 19 passes. The opening is of sufficient length to permit the pawl to be moved to an inoperative position without the screw interfering. It is obvious, however, that any other means may be employed for holding the cover-plate in position.

While I have illustrated the locking device in connection with tongs having special forms of gripping jaws, I desire to have it understood that the locking device is not necessarily limited to this type of tongs.

I have described the principle of operation of the invention, together with the apparatus which I now consider to be the best embodiment thereof; but I desire to have it understood that the apparatus shown is merely illustrative and that various changes may be made, when desired, as are within the scope of the invention.

What is claimed is—

1. A pair of tongs comprising jaws, handles connected therewith, an arm on one of the handles having serrations, a pawl on the other arm, a spring for urging the pawl toward the arm, a device connected with the pawl, and means on the handle having the pawl with which the device is adapted to interlock when the pawl is in withdrawn position for holding the latter out of engagement with the said arm.

2. A pair of tongs comprising jaws, handles connected therewith of which one is provided with an opening, an arm rigidly connected to one of the handles and extending through the opening of the other, serrations on the arm, a pawl mounted on the handle to engage the serrations on the arm, a pivotally-mounted finger on the pawl, and a notch on the handle carrying the pawl for holding the latter in an inoperative position.

3. A pair of tongs comprising jaws having main and auxiliary gripping-teeth, handles connected with the jaws, a locking device which automatically sets by the movement of the handles for holding the jaws gripped on a object, and means arranged to unlock the said device and adapted to be adjusted when the latter is in unlocked position for rendering the locking device inoperative.

4. A pair of tongs comprising jaws having two sets of gripping-teeth arranged to grip for movement in one direction, one set of teeth being formed integral with the jaws and the other being inlaid therein handles connected with the jaws, an arm on one of the handles provided with serrations, a spring-pressed pawl on the other handle arranged in operative relation with respect to the said arm to permit the handles to be moved to grip the tongs and to prevent the handles from moving in an opposite direction, and an adjustable device for holding the pawl in an inoperative position.

5. A pair of tongs comprising jaws, handles connected with the jaws one of which is provided with a chamber open at one side, overhanging shoulders on the chambered handle, a cover-plate engaging said shoulders for closing the chamber, a spring-actuated pawl in the chamber, a serrated arm rigid on one handle and extending across the other in operative relation to the pawl, and a device on the pawl extending exterior to the chamber for rendering the pawl inoperative.

In testimony that I claim the foregoing as my own I have hereto affixed my signature in the presence of two witnesses.

GEORGE WASHINGTON BAKER.

Witnesses:
E. H. ROWELL,
J. T. LAVEIGNE.